R. C. MOORE & R. E. BRADEN.
AUTOMOBILE LOCK.
APPLICATION FILED JUNE 18, 1914.
1,145,206.
Patented July 6, 1915.
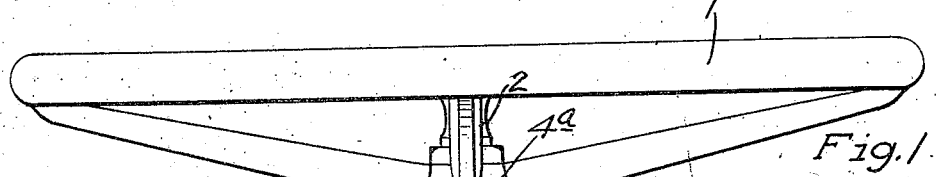
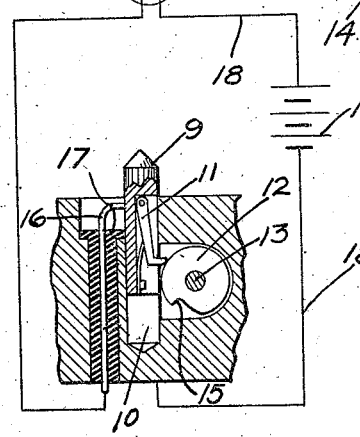
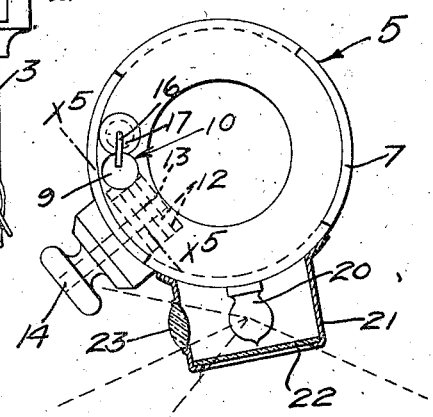
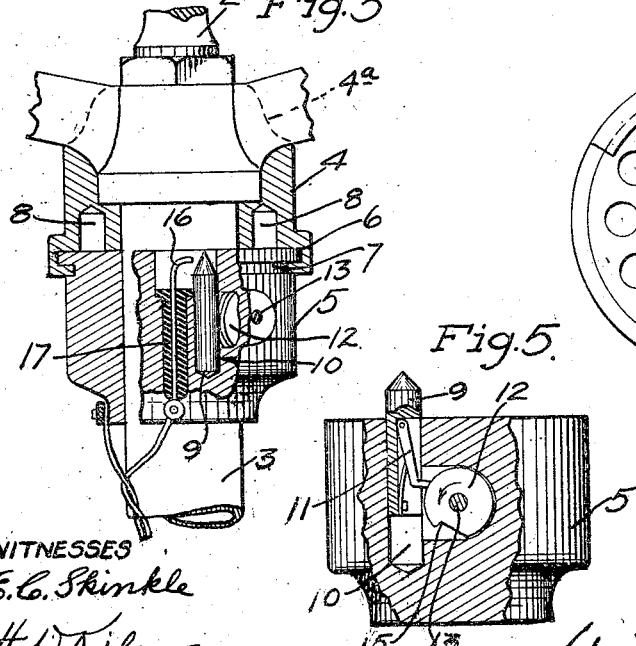
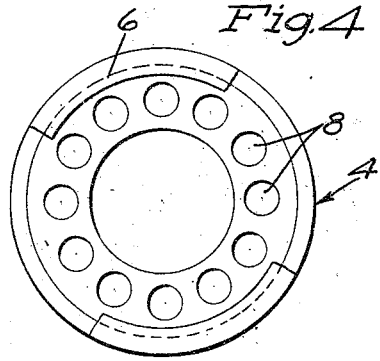
WITNESSES
E. C. Shinkle
H. D. Kilgore
INVENTORS
Royal C. Moore
Robert E. Braden
BY THEIR ATTORNEYS
Williamson Merchant

UNITED STATES PATENT OFFICE.

ROYAL C. MOORE AND ROBERT E. BRADEN, OF WAYZATA, MINNESOTA.

AUTOMOBILE-LOCK.

1,145,206.

Specification of Letters Patent.

Patented July 6, 1915.

Application filed June 13, 1914. Serial No. 845,820.

*To all whom it may concern:*

Be it known that we, ROYAL C. MOORE and ROBERT E. BRADEN, citizens of the United States, residing at Wayzata, in the county of Hennepin and State of Minnesota, have invented certain new and useful Improvements in Automobile-Locks; and we do hereby declare the following to be a full, clear, and exact description of the invention, such as will enable others skilled in the art to which it appertains to make and use the same.

Our invention has for its object to provide an improved lock and lock signal for automobiles, and to such ends, generally stated, the invention consists of the novel devices and combinations of devices hereinafter described and defined in the claims.

The lock is designed to secure relatively movable parts of an automobile in such manner as to render impossible to use or run the machine, and the signal device serves to indicate that the lock has been set, to thus put the machine out of commission.

From a broad point of view, the lock may be applied to any two relatively movable parts of the machine, which parts require movement, the one in respect to the other, in the running operation of the machine, but it is especially adapted for application to two hubs, one of which is secured on the steering wheel and the other on the steering post casing, and this is the application illustrated in the accompanying drawings.

In the accompanying drawings which illustrate the invention, like characters indicate like parts throughout the several views.

Referring to the drawings: Figure 1 is a view in elevation showing the lock applied as above indicated; Fig. 2 is a view partly in plan and partly in section showing the lower hub to which the lock and signal device are applied; Fig. 3 is an enlarged view corresponding to Fig. 1 with some parts sectioned and some parts broken away; Fig. 4 is a bottom plan view of the upper hub with which the lock coöperates; Fig. 5 is a view partly in elevation and with some parts sectioned approximately on the line $x^5$ $x^5$ on Fig. 2; and Fig. 6 is a view partly in section and partly in diagram, the parts in section corresponding closely to Fig. 5, and the diagram illustrating the signal circuit.

The numerals 1, 2 and 3 indicate, respectively, the steering wheel, the steering post, and the steering post casing, which parts may be of the usual or any suitable construction. The numerals 4 and 5 indicate, respectively, the upper and lower hubs with which the lock mechanism coöperates. Both of these hubs surround the steering post casing 3, and the upper hub 4 is secured for rotation with the steering wheel, while the lower hub 5 is secured to the steering post casing, and hence, is secured against rotation. These two hubs 4 and 5 are preferably formed with interlocking segmental flanges 6 and 7, respectively, which, when engaged, hold the two hubs against axial separation, and which may be engaged and disengaged only when the said flanges 6 and 7 are turned completely out of registration. Preferably, the said flanges 6 and 7 are but a trifle less than ninety degrees in extent, so that they can be engageable and disengageable only when turned apparently out or registration.

The lock proper is preferably applied to the lower and relatively fixed or non-rotary hub 5, and the upper hub 4 is preferably made detachable from the hub proper of the steering wheel, but held for rotation therewith, by means of upwardly extended arms $4^a$ that interpose between the spokes of the said steering wheel. In this described arrangement, the hub 4 is really supplemental to the hub proper, to the steering wheel, and is adapted for application to steering wheels already in use, but in applying the lock to new machines, the said upper hub would properly be cast integral with, or as a part of the steering wheel. The upper hub 4 is formed with a circumferentially spaced series of lock bolt seats or detents 8.

The lock proper comprises a lock bolt 9 mounted to move vertically in a seat 10 formed in the lower hub 5 concentric to the casing 3. The upper end of this lock bolt 9 is preferably tapered or made conical to adapt it to more readily enter one or the other of the lock seats 8 in the upper hub. The said bolt 9 is rounded to form a seat for a pivoted outwardly spring-pressed dog 11, the point of which is engageable with coöperating lock tumblers 12. These lock tumblers 12 are mounted in a suitable recess in the lower hub 5, and after the manner of an ordinary tumbler or combination lock, are applied, some rigidly and some loosely on the spindle 13 of an operating knob 14. These tumblers 12 are formed with peripheral notches 15, which, when alined, permit the free end of the dog 11 to move outward into the same, so that by proper rotation of the knob and tumblers, the lock bolt 9 may be drawn downward into an inoperative position shown in Fig. 3. Obviously, and unless all three of the tumblers are set to the proper combination, some one or the other of the tumblers will hold the dog 11 pressed into the lock bolt so that it cannot be drawn downward by rotation of the knob and tumblers. The lock bolt is thus drawn downward by rotation of the knob and tumblers in direction of the arrow marked on Fig. 5, and by rotation of the knob, and tumblers, in the opposite direction, the flat surface of the notches 15 will engage the free end of the dog 11 and force the lock bolt 9 upward into one or the other of the lock seats 8 of the upper hub 4, thereby locking the steering wheel so that it cannot be manipulated to steer the machine. Uusally, of course, the wheels of the machine will be turned sidewise, or at an angle to the rear wheels when locked. Attention is here also called to the fact that the lock seats 8 are so alined to the lock bolt 9 that the interlocking flanges 6 and 7 cannot be turned out of registration in any one of the locked positions of the hubs and steering wheel.

The movement of the lock bolt 9 into an operative position, also does another important thing, to-wit, it operates a so-called lock signal. This is preferably accomplished as follows:

The numeral 16 indicates a contact extended through an insulating sleeve 17 applied through the lower hub 6 adjacent to the lock bolt 9 and having a laterally bent end with which the said lock bolt 9 is engageable when, and only when, raised from its normal position shown in Fig. 3, into its locking or operating position shown in Figs. 5 and 6. The numeral 18 indicates the wires of the signal circuit, which circuit includes a battery 19 and a signal lamp in the form of a small electric bulb 20. One of the lead wires is connected to the above noted contact 17, and the other is grounded through the hub 5, and hence, through the lock bolt 9.

The electric light bulb 20 is preferably placed within a small casing 21 secured on the lower hub 5 and provided with a transparent face 22 on which, advisably, would be marked the word "Locked". Also, the case 21 may have one or more light lenses 23, which may be colored, if desired.

When the machine is thus actually locked, and the signal device set in action to indicate to the casual observer that the machine is thus locked, there will be little danger of anyone tampering with the machine. The device described is of small cost, may be easily applied to any and all automobiles and is efficient for the purposes had in view.

In the statement made in the introductory part of this specification, it will be understood that the lock and lock signal may be applied at various different places on the machine. For example, it might be applied to the starting crank, and the statement that it is applied to elements that require movement, one in respect to the other in the running operation of the machine, is intended to include this, as well as other modified arrangement or application of the device. The signaling mechanism herein disclosed is not herein claimed, but will be made the subject matter of a divisional application.

What we claim is:

1. In an automobile, the combination with a pair of coöperating hubs which require rotary movement, one in respect to the other, in the running operation of the machine, the said hubs being normally interlocked against axial separation, of a lock bolt applied to one of said hubs, and the other hub having a lock bolt seat coöperating with said bolt to hold the said hub members interlocked.

2. In an automobile, the combination with a pair of coöperating hubs which require movement, one in respect to the other, in the running operation of the machine, of a lock bolt applied to one of the said hubs, the other hub having a lock bolt seat coöperating with said lock bolt, the said hubs having interlocking segmental flanges adapting the hubs to be separated only when turned out of registration, the said lock bolt and detent of said hubs being arranged to hold the interlocking flanges of said hubs more or less in registration when the said hubs are locked against rotation.

3. In an automobile, the combination with a pair of coöperating hubs which require movement, one in respect to the other, in the running operation of the machine, of a lock bolt applied to one of said hubs, the other hub having a plurality of circumferentially spaced lock bolt seats coöperating with said lock bolt, and the said hubs having interlocking segmental flanges adapting the hubs to be axially separated only when said flanges are turned out of registration.

4. In an automobile, the combination with a steering post and steering post casing, the said steering post having a hand piece secured to its upper end, of coöperating hub portions intermediately below said hand piece, secured, one to the upper end of said steering post and the other to the upper end of said casing, the said hubs having interlocking flanges adapting the hubs to be separated only when turned out of registration, and a lock bolt applied to one of the said hubs, the other hub having a lock bolt seat coöperating with said bolt to hold the flanges of said hubs in interlocking engagement.

In testimony whereof we affix our signatures in presence of two witnesses.

ROYAL C. MOORE.
ROBERT E. BRADEN.

Witnesses:
HARRY D. KILYON,
F. D. MERCHANT.